United States Patent
Chen et al.

(10) Patent No.: US 8,177,303 B2
(45) Date of Patent: May 15, 2012

(54) SEATBELT ADJUSTING DEVICE

(75) Inventors: Shun-Min Chen, Taipei (TW); Wen-Qu Hu, Taipei (TW)

(73) Assignee: Wonderland Nurserygoods Co., Ltd., Taipei (TW)

( * ) Notice: Subject to any disclaimer, the term of this patent is extended or adjusted under 35 U.S.C. 154(b) by 0 days.

(21) Appl. No.: 13/114,864

(22) Filed: May 24, 2011

(65) Prior Publication Data
US 2011/0221258 A1  Sep. 15, 2011

Related U.S. Application Data

(62) Division of application No. 12/358,395, filed on Jan. 23, 2009, now abandoned.

(30) Foreign Application Priority Data

Aug. 18, 2008  (CN) .................. 2008 2 0131296 U

(51) Int. Cl.
*A62B 35/00* (2006.01)

(52) U.S. Cl. ........ 297/484; 297/474; 297/464; 297/479; 297/250.1; 297/256.15

(58) Field of Classification Search .................. 297/464, 297/473, 474, 479, 484, 250.1, 256.15
See application file for complete search history.

(56) References Cited

U.S. PATENT DOCUMENTS

| | | | | |
|---|---|---|---|---|
| 5,435,626 A * | 7/1995 | Lai | ............................ | 297/411.36 |
| 5,683,138 A * | 11/1997 | Ward et al. | ................ | 297/256.15 |
| 6,155,638 A * | 12/2000 | Bapst | ......................... | 297/250.1 |
| 7,370,912 B2 * | 5/2008 | Williams et al. | ......... | 297/256.11 |
| 7,387,336 B2 * | 6/2008 | Sakumoto | ................... | 297/250.1 |
| 7,690,729 B2 * | 4/2010 | Liao | ............................... | 297/408 |
| 2004/0189068 A1 * | 9/2004 | Meeker et al. | ............. | 297/250.1 |

* cited by examiner

*Primary Examiner* — Laurie Cranmer
(74) *Attorney, Agent, or Firm* — Fennemore Craig, P.C.

(57) ABSTRACT

A seatbelt adjusting device includes: a guiding track provided with a plurality of first engaging members; a belt-connecting slider mounted on the guiding track and slidable on the guiding track; an actuator mounted movably on the belt-connecting slider, provided with a second engaging member, and operable to move relative to the belt-connecting slider between an engaging position, in which the second engaging member engages releasably an aligned one of the first engaging members, and a disengaging position, in which the second engaging member is disengaged from the first engaging members; and an urging member urging against the actuator for restoring the actuator from the disengaging position to the engaging position.

5 Claims, 11 Drawing Sheets

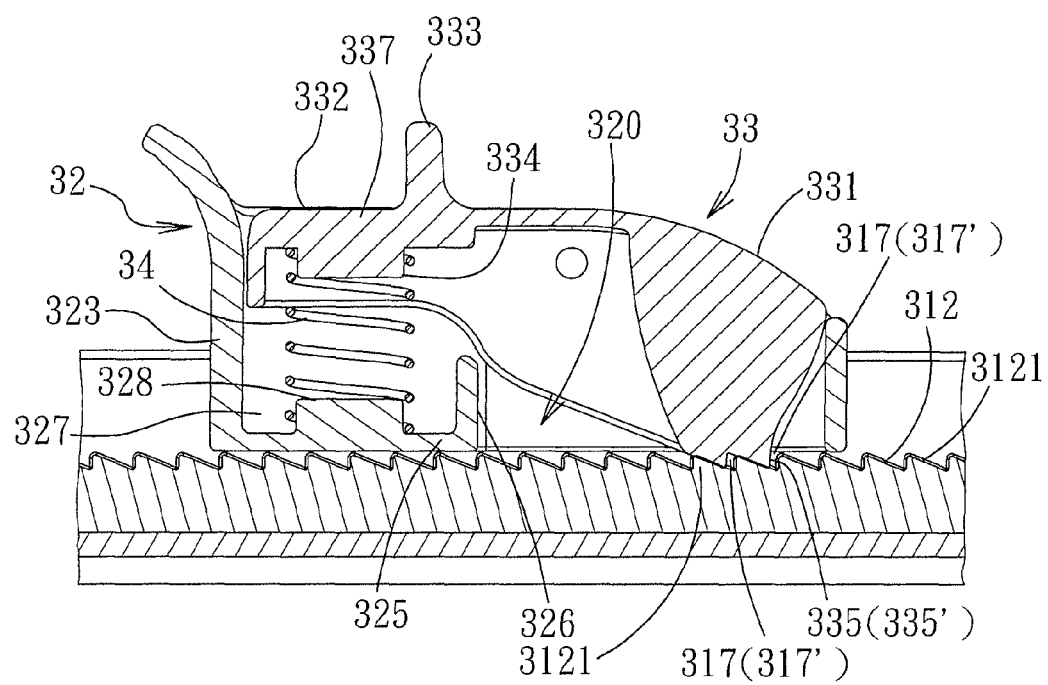
F I G. 8

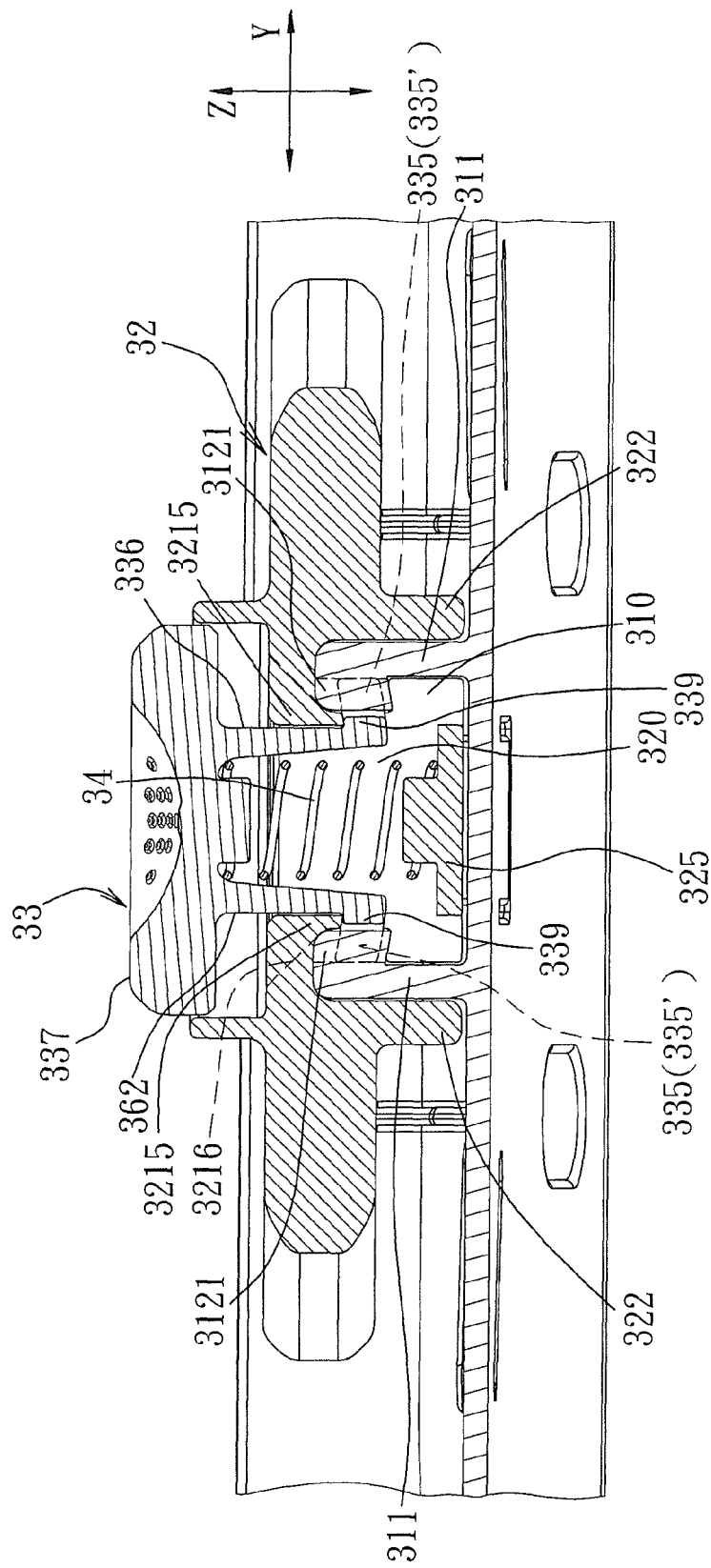
F I G. 10

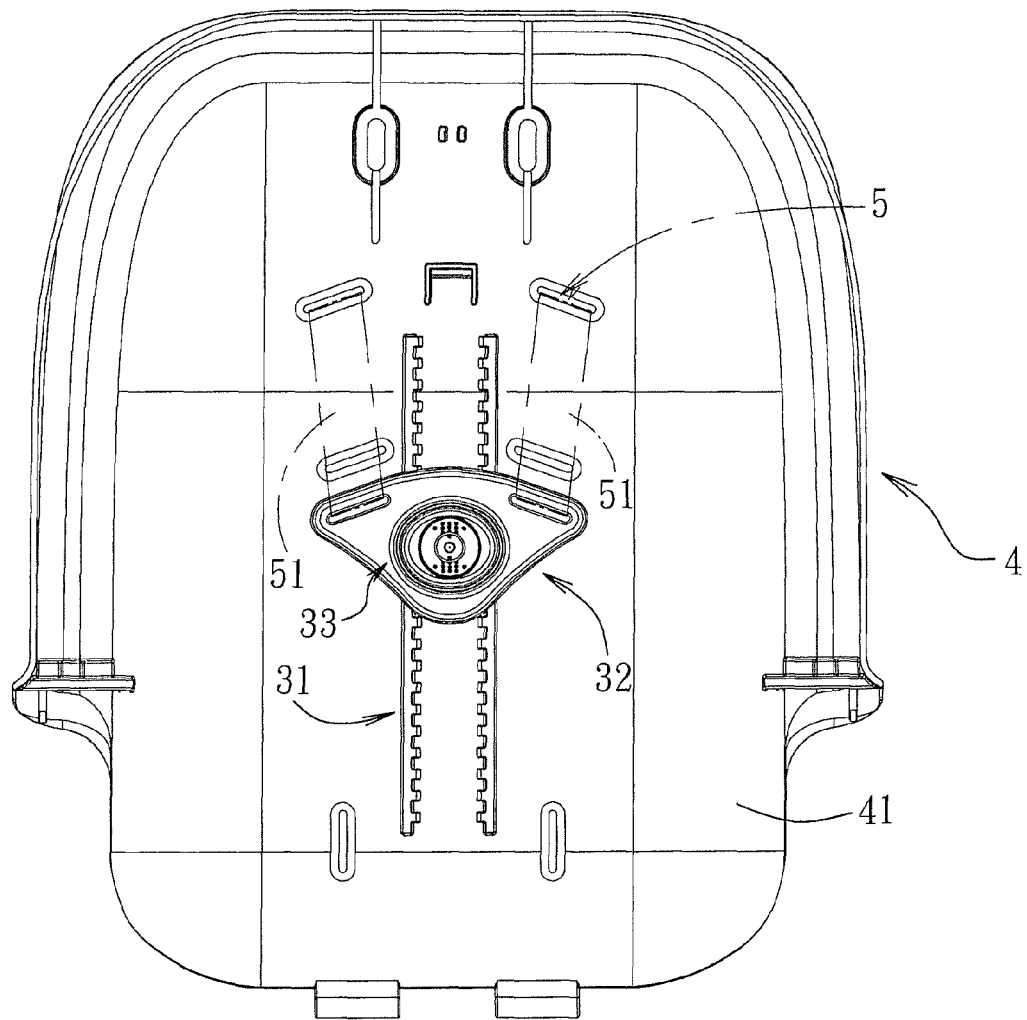
F I G. 13

US 8,177,303 B2

SEATBELT ADJUSTING DEVICE

CROSS-REFERENCE TO RELATED APPLICATIONS

This application is a division of U.S. application Ser. No. 12/358,395, filed Jan. 23, 2009, which claims priority to Chinese Application No. 200820131296.0, filed on Aug. 18, 2008.

BACKGROUND OF THE INVENTION

1. Field of Invention

The invention relates to a seatbelt adjusting device, more particularly to a seatbelt adjusting device including a guiding track and a slider connected to a seatbelt and mounted slidably on the guiding track.

2. Description of the Related Art

U.S. Pat. No. 4,790,601 discloses a conventional seatbelt adjusting device (see FIGS. 1 and 2) for adjusting a seatbelt (not shown) on a backrest 11 of a safety seat 1. The backrest 11 is formed with a pair of slots 12 for extension of shoulder straps of the seatbelt therethrough, and is provided with a pair of guiding rails 13 on a back side thereof. The seatbelt adjusting device includes a travel plate 14 mounted slidably on the guiding rails 13 and formed with a pair of through-holes 142 for extension of the shoulder straps therethrough, a bracket 15 mounted on the backrest 11, a threaded flange 141 secured to the travel plate 14 and aligned with the bracket 15, and a threaded rod 16 engaging threadedly the bracket 15 and the threaded flange 141. As such, rotation of the threaded rod 16 results in an increase or decrease in the distance between the threaded flange 141 and the bracket 15, thereby permitting adjustment of the lengths of the shoulder straps, that are exposed at the back side of the backrest 11.

However, since the threaded rod 16 is exposed from the back side of the backrest 11, it can be accessed by a child sitting behind the safety chair, thereby causing a potential safety problem. In addition, to 10 adjust the lengths of the shoulder straps of the seatbelt, one hand is required to rotate the threaded rod 16, and the other hand is required to hold and to move the travel plate 14, which is relatively inconvenient during adjustment of the seatbelt.

SUMMARY OF THE INVENTION

Therefore, the object of the present invention is to provide a seatbelt adjusting device that can overcome the aforesaid drawbacks of the prior art.

Accordingly, a seatbelt adjusting device of this invention is adapted for a safety seat having an upright backrest and a seatbelt connected to the backrest. The seatbelt adjusting device comprises: a guiding track adapted to be secured to the backrest, extending in a direction, having first and second ends opposite to each other in the direction, and provided with a plurality of first engaging members that are aligned with each other along the direction; a belt-connecting slider mounted on the guiding track, adapted to be connected to the seatbelt, and slidable on the guiding track in the direction for adjusting the seatbelt; an actuator provided with a second engaging member and mounted movably on the belt-connecting slider so as to be co-slidable with the belt-connecting slider on the guiding track to align the second engaging member with one of the first engaging members, the actuator being operable to move relative to the belt-connecting slider between an engaging position and a disengaging position, wherein the second engaging member engages releasably with one of the first engaging members in the engaging position, thereby preventing sliding movement of the belt-connecting slider on the guiding track at least in a direction toward one of the first and second ends of the guiding track, and the second engaging member is disengaged from the first engaging members in the disengaging position, thereby permitting sliding movement of the belt-connecting slider on the guiding track in the direction between the first and second ends of the guiding track; and an urging member urging the actuator to restore the actuator from the disengaging position to the engaging position.

BRIEF DESCRIPTION OF THE DRAWINGS

Other features and advantages of the present invention will become apparent in the following tailed description of the preferred embodiments with reference to the accompanying drawings, of which:

FIG. 8 is a fragmentary sectional view of the first preferred embodiment, illustrating a state where an actuator is disposed at an engaging position;

FIG. 10 is a fragmentary sectional view of the second preferred embodiment, illustrating a state where the actuator is disposed at the engaging position;

FIG. 13 is a schematic view of the second preferred embodiment, illustrating another state where the belt-connecting slider is disposed at a lower position relative to the backrest of the safety seat.

DETAILED DESCRIPTION OF THE PREFERRED EMBODIMENTS

Figure 1:
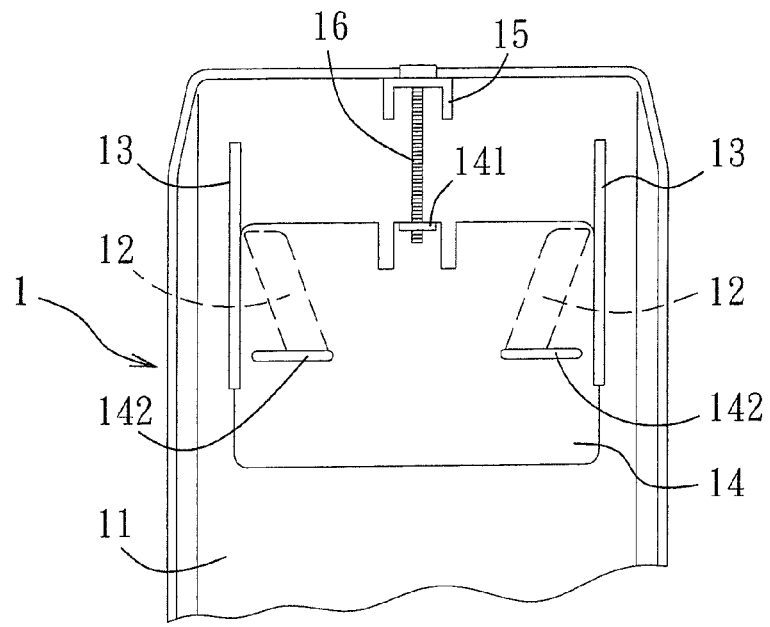
FIG. 1 is a fragmentary schematic view of a conventional seatbelt adjusting device mounted on a backrest of a safety seat, illustrating a state where a travel plate is disposed at a first position.
Figure 2:
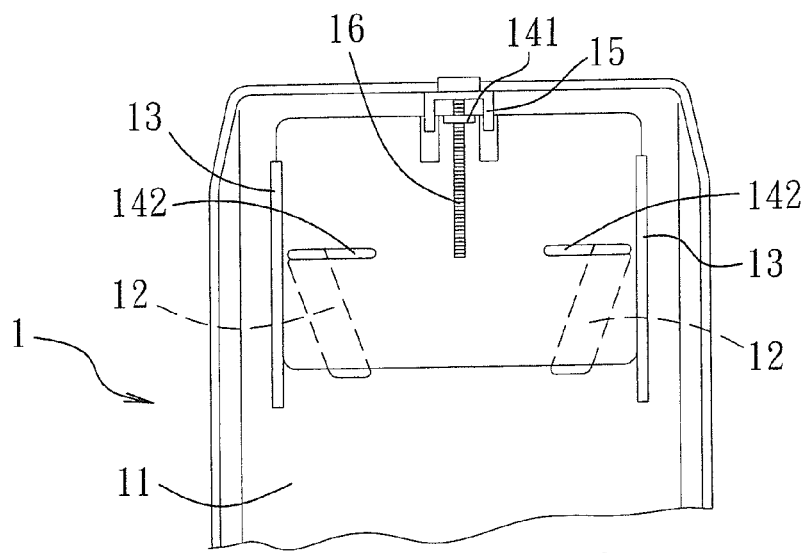
FIG. 2 is a fragmentary schematic view of the conventional seatbelt adjusting device, illustrating another state where the travel plate is disposed at a second position.

Before the present invention is described in greater detail with reference to the accompanying preferred embodiments, it should be noted herein that like elements are denoted by the same reference numerals throughout the disclosure.

Figure 3:
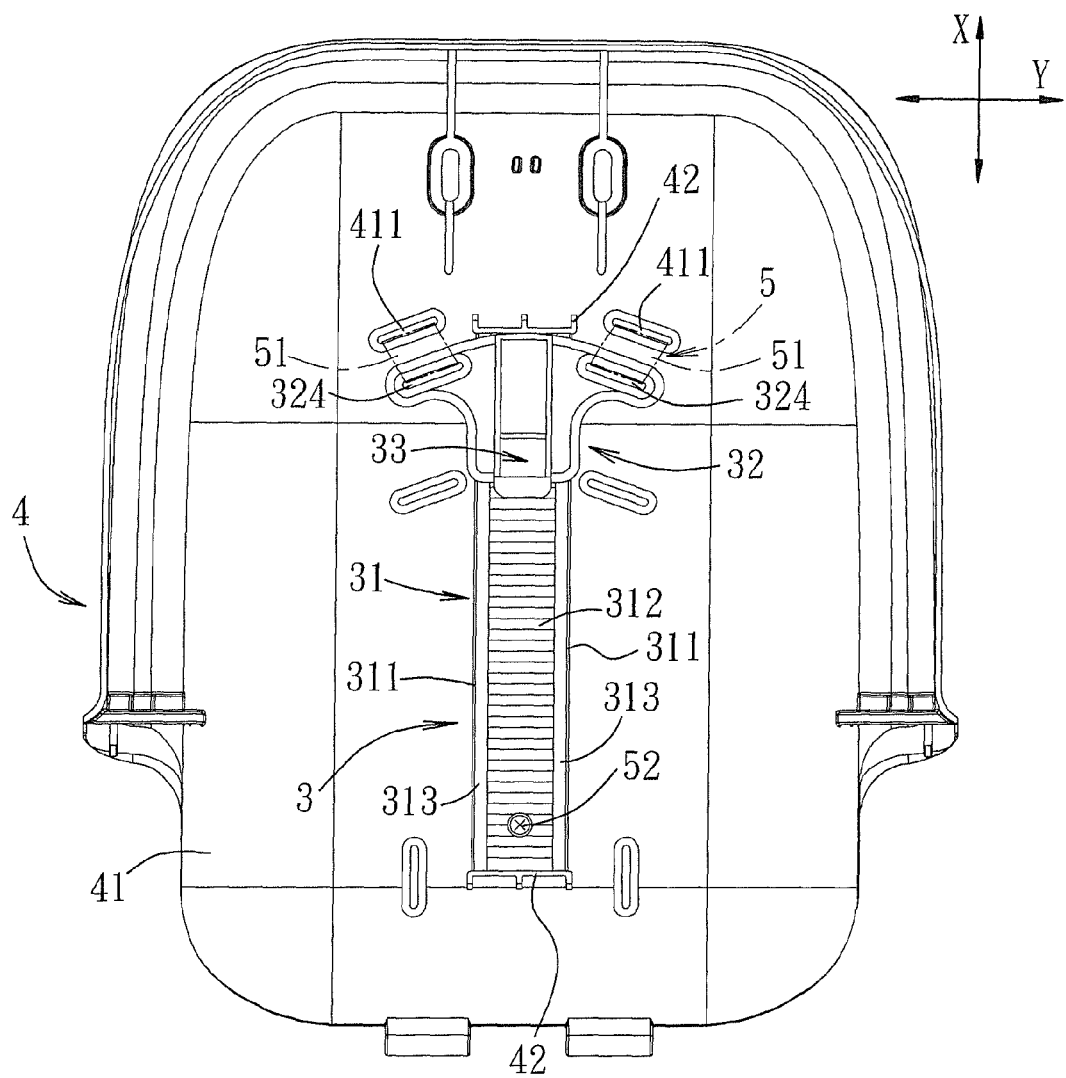
FIG. 3 is a schematic view of the first preferred embodiment of a seatbelt adjusting device according to the present invention, illustrating a state where a belt-connecting slider is disposed at an upper position relative to a backrest of a safety seat.
Figure 4:
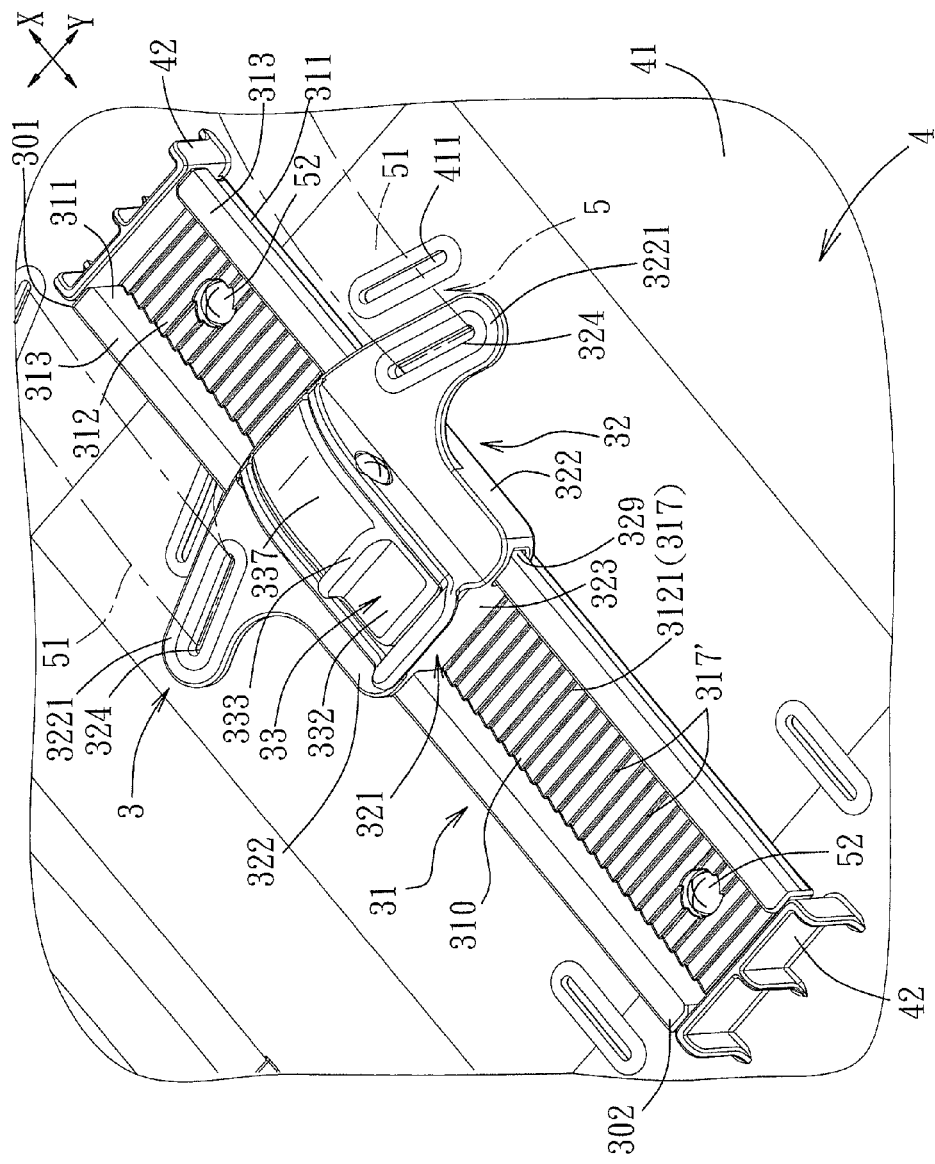
FIG. 4 is a fragmentary perspective view of the first preferred embodiment, illustrating another state where the belt-connecting slider is disposed at a lower position relative to the backrest of the safety seat.
Figure 5:
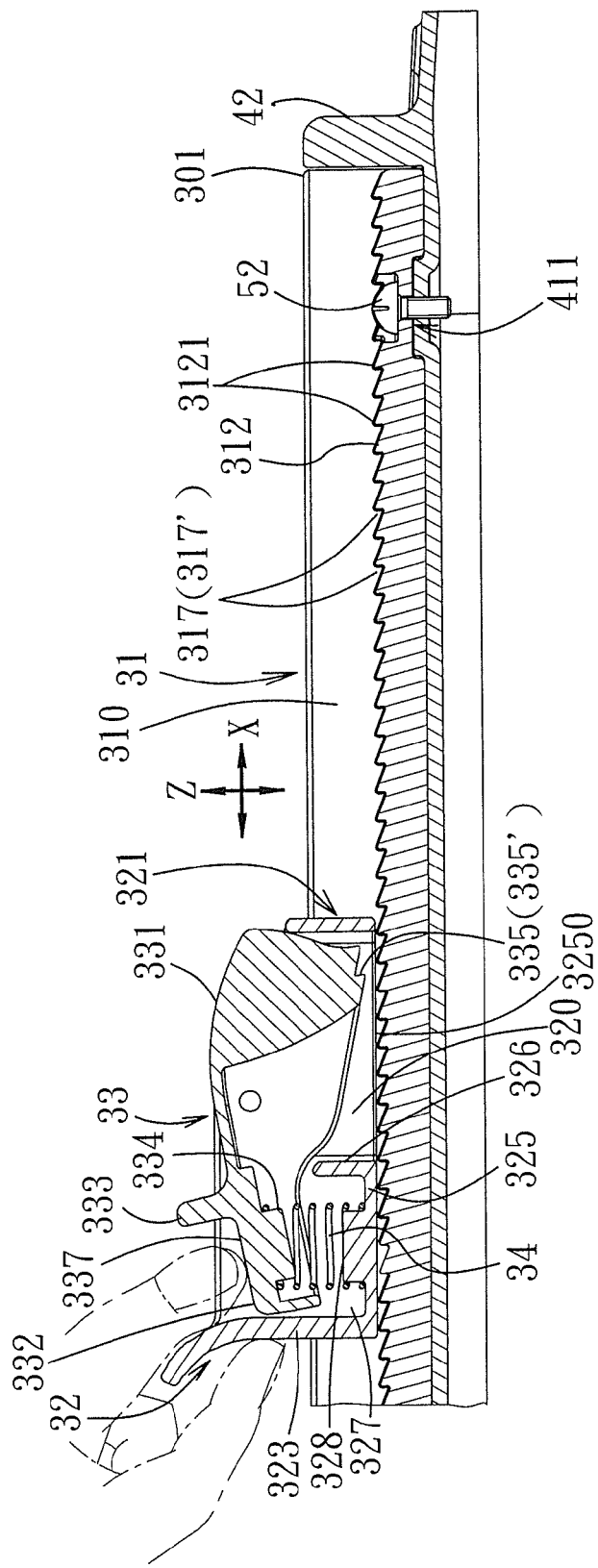
FIG. 5 is a fragmentary sectional view of the first preferred embodiment, illustrating a state where an actuator is disposed at a disengaging position.

Referring to FIGS. 4 and 5, in combination with FIG. 3, the first preferred embodiment of a seatbelt adjusting device 3 according to the present invention is shown to be adapted for a safety seat 4 having an upright backrest 41 and a seatbelt 5 with two shoulder straps 51 connected to the backrest 41. The seatbelt 5 extends from a front side of the backrest 41 through one of pairs of through-holes 411 in the backrest 41 and to a back side of the backrest 41 to connect with the seatbelt adjusting device 3. In this embodiment, at least one of the pairs of the through-holes 411 extend along the length of the backrest 41.

The seatbelt adjusting device 3 includes: a guiding track 31 secured to the back side of the backrest 41 through a pair of fasteners 52, extending in a first direction (X), having first and second ends 301, 302 opposite to each other in the first direction (X), and provided with a plurality of first engaging members 317 (see FIG. 5) that are aligned with each other along the first direction (X); a belt-connecting slider 32 mounted on the guiding track 31, connected to the seatbelt 5, and slidable on the guiding track 31 in the first direction (X) for adjusting the seatbelt 5; an actuator 33 provided with at least one second engaging member 335 (note that two second engaging members 335 are provided in this embodiment, and that only one is discussed hereinafter for the sake of brevity) and mounted movably on the belt-connecting slider 32 so as to be co-slidable with the belt-connecting slider 32 on the guiding track 31 to align the second engaging member 335 with a desired one of the first engaging members 317 for adjusting the seatbelt 5. In this embodiment, the actuator 33 is exemplified by a button which can be operated in a pressable or pullable manner for actuating engagement and disengagement between the first and second engaging members 317, 335.

The actuator 33 is operable to move relative to the belt-connecting slider 32 between an engaging position (see FIG. 8), in which the second engaging member 335 engages releasably an aligned one of the first engaging members 317, thereby preventing sliding movement of the belt-connecting slider 32 on the guiding track 31 at least in a direction toward one of the first and second ends 301, 302 of the guiding track 31 (in this embodiment, the belt-connecting slider 32 is prevented from sliding on the guiding track 31 in the first direction (X) toward the first end 301 of the guiding track 31), and a disengaging position (see FIG. 5), in which the second engaging member 335 is disengaged from the first engaging members 317, thereby permitting sliding movement of the belt-connecting slider 32 on the guiding track 31 in the first direction (X) between the first and second ends 301, 302 of the guiding track 31; and an urging member 34 urging the actuator 33 to restore the actuator 33 from the disengaging position to the engaging position.

In this embodiment, the guiding track 31 includes a pair of parallel rails 311 that are opposite to each other in a second direction (Y) transverse to the first direction (X), and a rack 312 that is disposed between and that interconnects the rails 311 and that is formed with first teeth 3121 aligned with each other in the first direction (X). The first teeth 3121 define the first engaging members 317, respectively, and further define engaging grooves 317' there among. The belt-connecting slider 32 is mounted slidably on the rails 311. The actuator 33 is formed with at least one second tooth 335' that defines the second engaging member 335, that is aligned with an aligned one of the engaging grooves 317' in a transverse direction (Z) relative to the first and second directions (X, Y), and that extends into the aligned one of the engaging grooves 317' defined by the first teeth 3121 when the actuator 33 is disposed at the engaging position.

The rack 312 cooperates with the rails 311 to define a trough 310 there among. Each of the rails 311 has an end lip 313 adjacent to the rack 312 and projecting laterally and outwardly of the trough 310 in the second direction (Y). The belt-connecting slider 32 includes a central part 321 that is received in the trough 310, and a pair of wings 322 that are opposite to each other in the second direction (Y) and that project outwardly and laterally from the central part 321. Each of the wings 322 defines a guiding groove 329 extending in the first direction (X) for a respective one of the end lips 313 extending through the guiding groove 329 (see FIGS. 4 and 7) so as to permit sliding movement of the belt-connecting slider 32 on the rails 311. Each of the wings 322 has an extension 3221 that has a through-hole 324 formed thereon, through which the seatbelt 5 extends.

Figure 6:
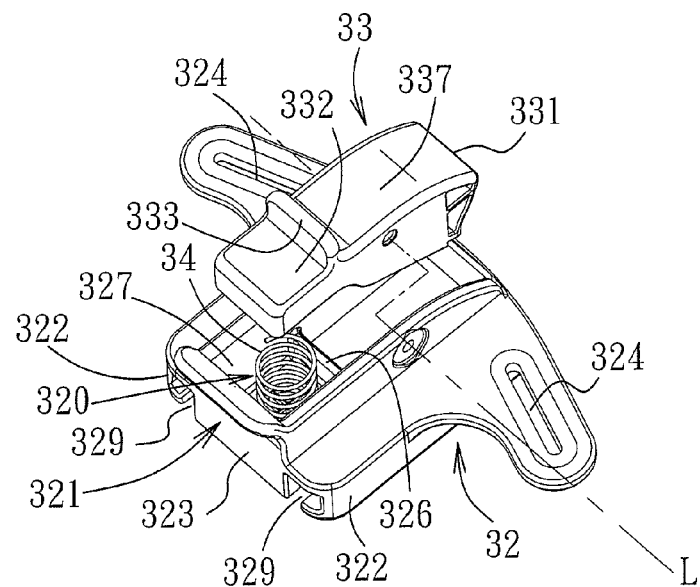
FIG. 6 is a perspective view of an assembly of the actuator and the belt-connecting slider of the first preferred embodiment.

The central part 321 defines an accommodating space 320 (see FIG. 6). The actuator 33 is received in the accommodating space 320. The actuator 33 has an engaging end 331, a pressing end 332 opposite to the engaging end 331 in the first direction (X), and a pivot portion disposed between the engaging end 331 and the pressing end 332. The pivot portion of the actuator 33 is pivoted to the central part 321 of the belt-connecting slider 32 so as to be rotatable relative to the belt-connecting slider 32 about an axis (L) (see FIG. 6) between the engaging and disengaging positions. The axis (L) is disposed between the pressing end 332 and the engaging end 331 of the actuator 33, and extends in the second direction (Y). The second tooth 335' protrudes from a bottom side of the engaging end 331 of the actuator 33. The urging member 34 abuts against a bottom side of the pressing end 332 of the actuator 33 to move the actuator 33 to the engaging position.

In this embodiment, the central part 321 of the belt-connecting slider 32 has a bottom wall 325 that is formed with a first protrusion 328 protruding into the accommodating space 320, and a bottom opening 3250 (see FIG. 5) that is in spatial communication with the accommodating space 320 for the second engaging member 335 extending through the bottom opening 3250. The actuator 33 has a top wall 337 that is formed with a second protrusion 334 protruding into the accommodating space 320, disposed at the pressing end 332 of the actuator 33, and aligned with the first protrusion 328 in the transverse direction (Z) relative to the first and second directions (X, Y). The urging member 34 is in the form of a compression spring that is sleeved on the first and second protrusions 328, 334.

The central part 321 of the belt-connecting slider 32 further has an end wall 323 extending upwardly from the bottom wall 325, and a confining wall 326 extending from the bottom wall 325 in the transverse direction (Z) into the accommodating space 320, aligned with the end wall 323 in the first direction (X), and cooperating with the end wall 323 to define a spring-confining recess 327 therebetween. The first protrusion 328 protrudes from the bottom wall 325 into the spring-confining recess 327. The urging member 34 has a lower portion confined in the spring-confining recess 327.

In this embodiment, the seatbelt adjusting device 3 further includes first and second stoppers 42 connected to the first and second ends 301, 302 of the guiding track 31, respectively, for preventing undesired removal of the belt-connecting slider 32 from the first and second ends 301, 302 of the guiding track 31.

The top wall 337 of the actuator 33 is formed with a partitioning wall 333 to divide the engaging end 331 and the pressing end 332 of the actuator 33 so as to facilitate locating of the pressing end 332 when the user intends to press the pressing end 332 of the actuator 33 (see FIG. 5). The end wall 323 of the central part 321 of the belt-connecting slider 32 has a curved end portion for serving as a grip when the user intends to pull the belt-connecting slider 32 to slide on the guiding track 31. As such, as best illustrated in FIG. 5, the user can use two fingers to hold the curved end portion of the end wall 323 of the belt-connecting slider 32 with one of the two fingers pressing the pressing end 332 of the actuator 33 for simultaneously disengaging the second engaging member 335 from the aligned one of the first engaging members 317 and pulling the belt-connecting slider 32 to move on the guiding track 31.

Figure 7:
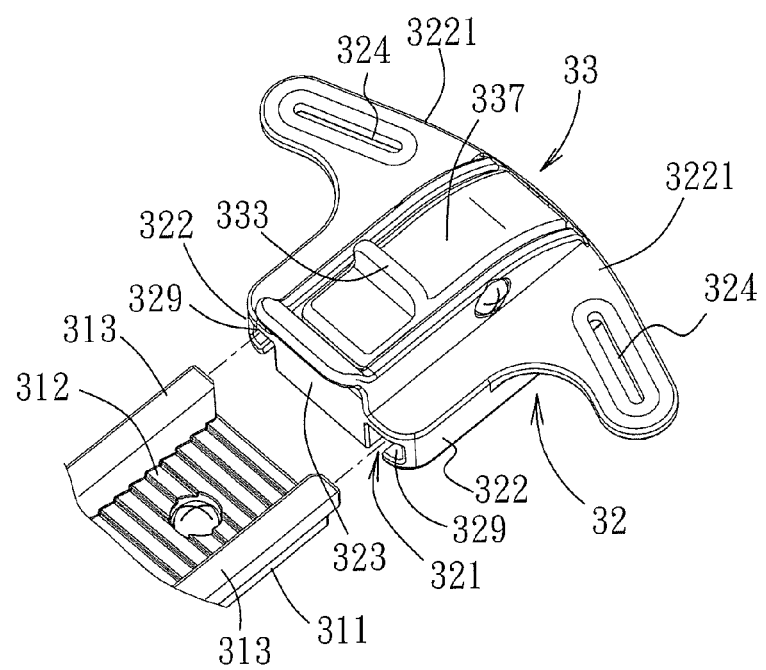
FIG. 7 is a fragmentary perspective view to illustrate how the belt-connecting slider is mounted on a guiding track of the first preferred embodiment.
Figure 9:
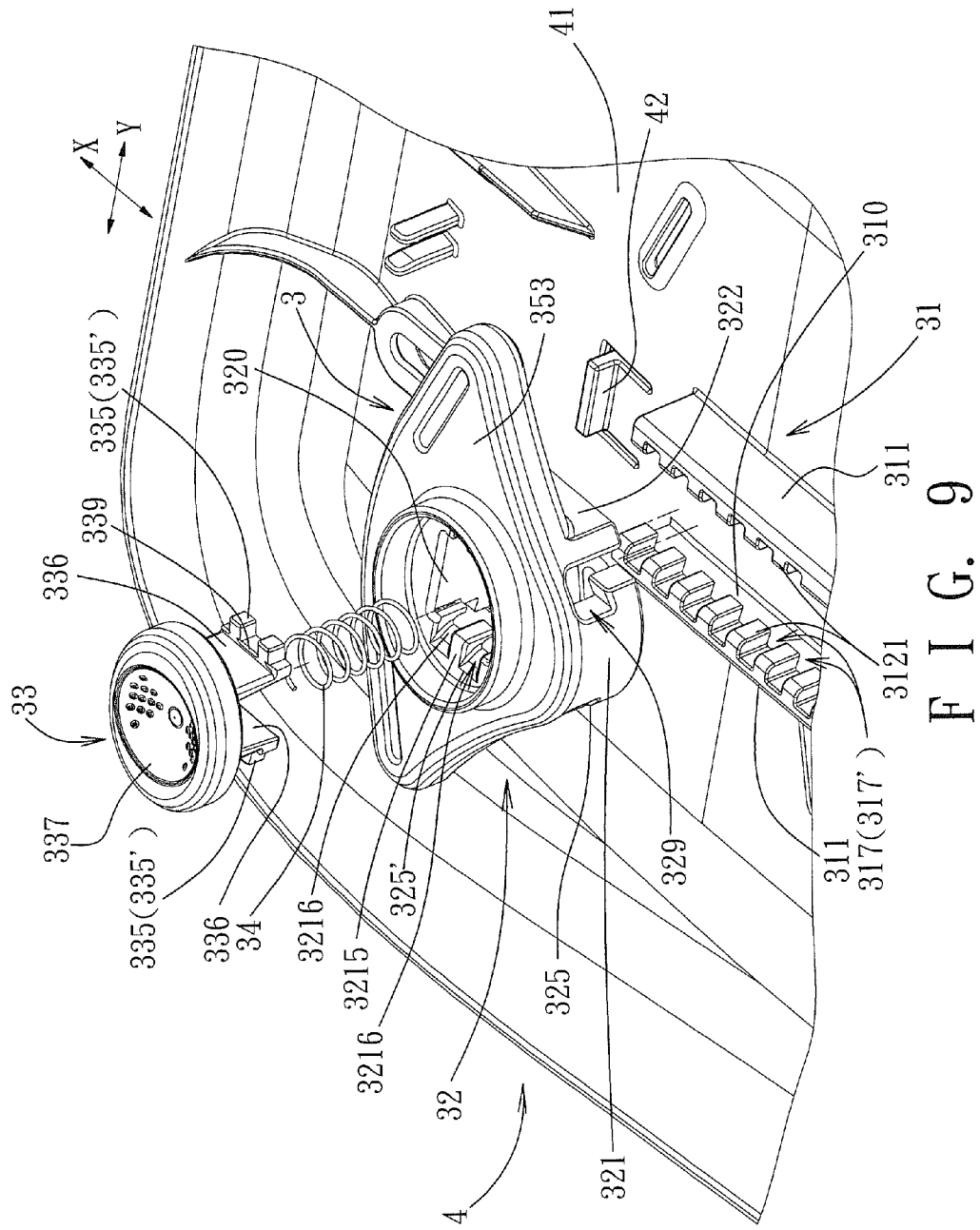
FIG. 9 is a fragmentary exploded perspective view of the second preferred embodiment of a seatbelt adjusting device according to the present invention.
Figure 11:
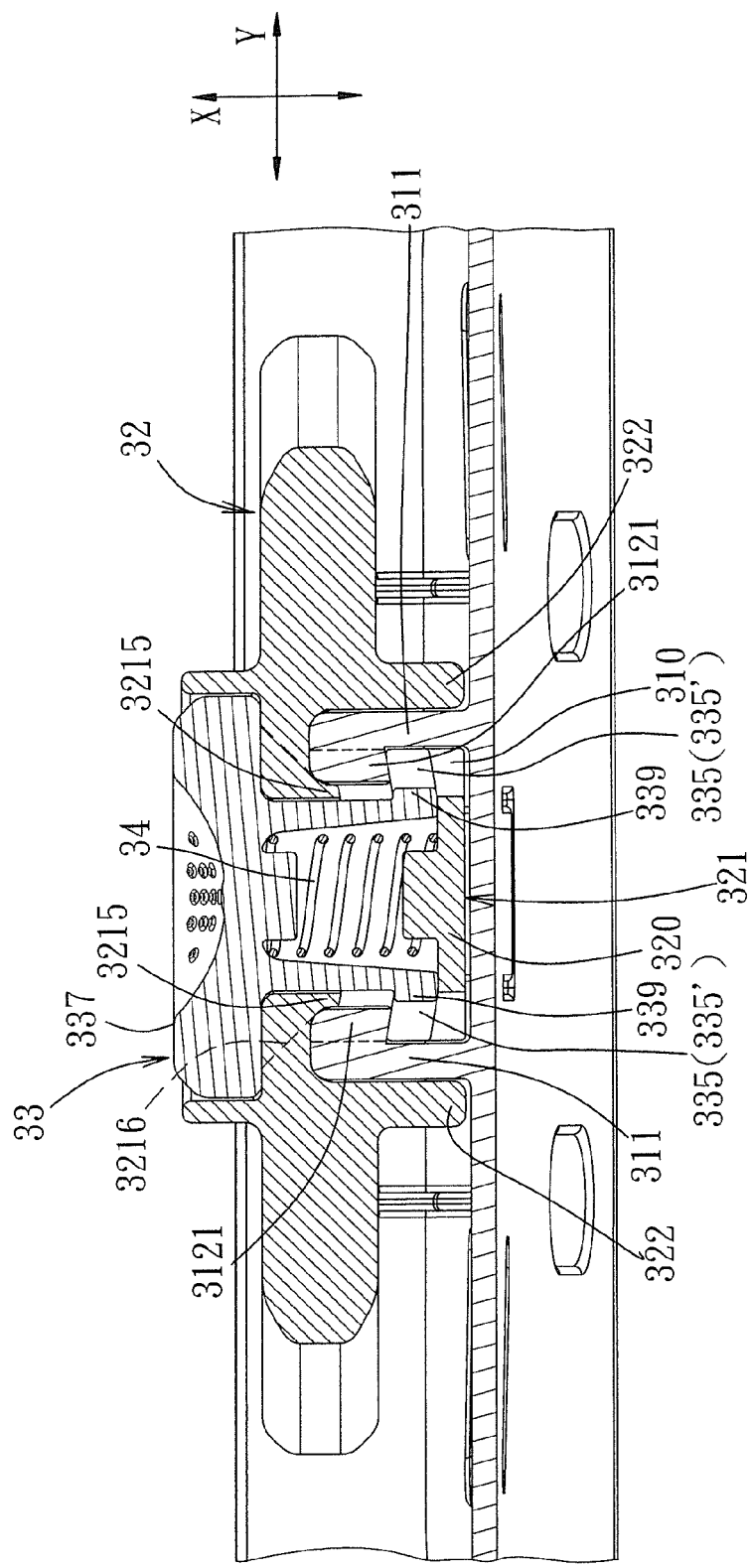
FIG. 11 is a fragmentary sectional view of the second preferred embodiment, illustrating another state where the actuator is disposed at the disengaging position.
Figure 12:
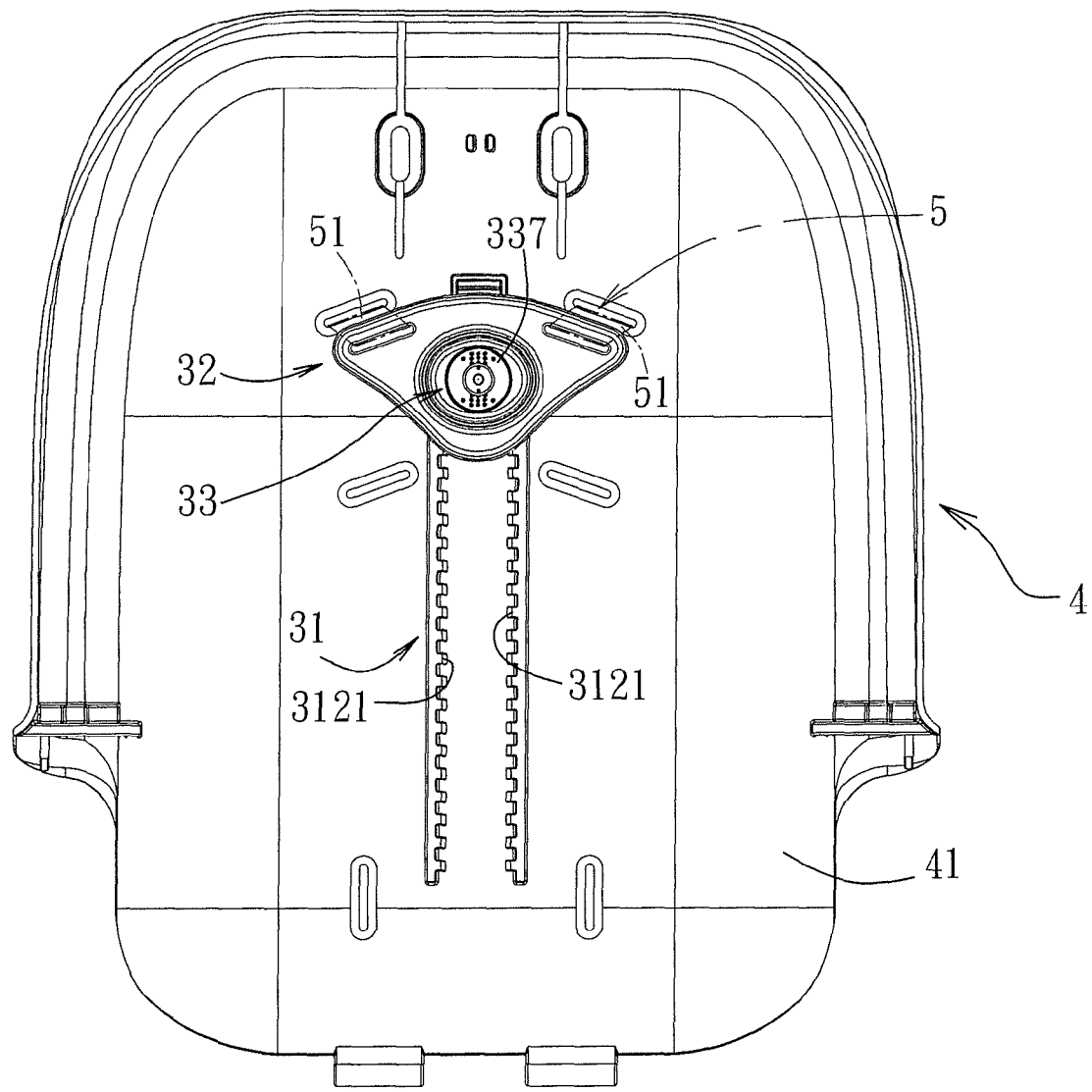
FIG. 12 is a schematic view of the second preferred embodiment, illustrating state where the belt-connecting slider is disposed at an upper position relative to the backrest of the safety seat.

During assembly, the urging member 34 and the actuator 33 are mounted one by one on the belt-connecting slider 32 (see FIG. 6), and the belt-connecting slider 32 is subsequently mounted on the guiding track 31 by extending the end lips 313 of the rails 311 into and through the guiding grooves 329, respectively (see FIG. 7). The guiding track 31 is secured to the backrest 41 through the fasteners 52. The shoulder straps 51 of the seatbelt 5 are then extended through the through-holes 411 in the backrest 41 and the through-holes 324 in the extensions 3221 of the wings 322 of the belt-connecting slider 32 so as to complete assembly of the seatbelt adjusting device 3.

In use, when the lengths of the shoulder straps 51 of the seatbelt 5, that are exposed from the backside of the backrest 4, are to be adjusted from a first length (see FIG. 3) to a second length (see FIG. 4), the pressing end 332 of the actuator 33 is pressed by the user (see FIG. 5) so as to move the actuator 33 from the engaging position to the disengaging position to disengage the second engaging member 335 from the first engaging members 317, and the belt-connecting slider 32 is subsequently pulled or pushed to slide on the guiding track 31 in the first direction (X) to a desired position between the first and second ends 301, 302 of the guiding track 31 so as to adjust the length of the shoulder straps 51. When the actuator 33 is released from the pressing action after the seatbelt 5 is adjusted, the actuator 33 is restored from the disengaging position to the engaging position by the urging action of the urging member 34.

FIGS. 9 to 12 illustrate the second preferred embodiment of a seatbelt adjusting device 3 according to the present invention. The second preferred embodiment differs from the previous preferred embodiment in that the rack 312 is dispensed with in this embodiment and that each of the rails 311 is formed with first teeth 3121 projecting therefrom in the second direction (Y) and aligned with each other in the first direction (X). Each two adjacent ones of the first teeth 3121 cooperatively define an engaging groove 317' therebetween. The first teeth 3121 define the first engaging members 317, and the engaging grooves 317' formed therebetween alternately. The actuator 33 is formed with two opposite pairs of second teeth 335' that protrude oppositely therefrom in the second direction (Y) and that define the second engaging members 335. Each pair of the second teeth 335' extend into aligned ones of the engaging grooves 317' in a respective one of the rails 311 which are aligned therewith in the transverse direction (Z) when the actuator 33 is disposed at the engaging position (see FIG. 10). Each pair of the second teeth 335' are disposed outwardly of the aligned ones of the engaging grooves 317' in the respective one of the rails 311 below the first teeth 3121 and above the backrest 41 when the actuator 33 is disposed at the disengaging position (see FIG. 11).

In this embodiment, the rails 311 cooperatively define a trough 310 therebetween. The belt-connecting slider 32 includes a central part 321 that is received in the trough 310, and a pair of wings 322 that are opposite to each other in the second direction (Y) and that project outwardly and laterally from the central part 321. Each of the wings 322 defines a guiding groove 329 extending in the first direction (X) for respective rails 311 extending therethrough so as to permit sliding movement of the belt-connecting slider 32 on the rails 311. The first teeth 3121 of each of the rails 311 that engage a respective pair of the second teeth 335' are disposed in a respective one of the guiding grooves 329 in the wings 322.

The central part 321 has a top open end 325' (see FIG. 9) and a bottom wall 325, and defines an accommodating space 320 in spatial communication with the guiding grooves 329 in the wings 322. The top open end 325' of the central part 321 is provided with two opposite limiting brims 3216 (see FIGS. 9 and 10) disposed above the bottom wall 325 and protruding toward each other into the accommodating space 320 in the second direction (Y). The actuator 33 includes a top wall 337 that is disposed above the limiting brims 3216 and that is aligned with the bottom wall 325 of the central part 321 in the transverse direction (Z) relative to the first and second directions (X, Y), and two opposite legs 336 extending downwardly from the top wall 337 of the actuator 33 through the top open end 325' of the central part 321 and into the accommodating space 320. Each of the legs 336 is formed with a respective pair of the second teeth 335' that are disposed below a respective one of the limiting brims 3216 and that protrude therefrom in the second direction (Y) into the guiding groove 329 in a respective one of the wings 322. The urging member 34 is disposed between and confined by the legs 336 of the actuator 33. Each of the limiting brims 3216 has an inclined upper wall that is inclined relative to the transverse direction (Z) and the second direction (Y). A guiding protrusion 3215 protrudes from the inclined upper wall of each of the limiting brims 3216 into the accommodating space 320 for guiding sliding movement of a respective pair of the second teeth 335' on the inclined upper wall of the respective limiting brim 3216 during mounting of the actuator 33 to the central part 321 of the belt-connecting slider 32. The legs 336 are slightly bent toward each other during sliding movement on the inclined upper walls of the limiting brims 3216, from top sides of the limiting brims 3216 and toward the bottom sides of the limiting brims 3216. The second teeth 335' on the legs 336 abut respectively against the bottom sides of limiting brims 3216 by the urging action of the urging member 34 when the actuator 33 is disposed at the engaging position (see FIG. 10) so as to prevent undesired removal of the actuator 33 from the belt-connecting slider 32.

Note that bottoms of the first teeth 3121 are flush to each other and are spaced part from the backside of the backrest 41 by a space for receiving the second engaging members 335 therein when the actuator 33 is disposed at the disengaging position so as to permit sliding movement of the belt-connecting slider 32 on the rails 311 without interference between the first and second engaging members 317, 335.

In use, when the lengths of the shoulder straps 51 of the seatbelt 5, that are exposed from the backside of the backrest 4, are to be adjusted from a first length (see FIG. 12) to a second length (see FIG. 13), the top wall 337 of the actuator 33 is pressed so as to move the actuator 33 from the engaging position (see FIG. 10) to the disengaging position (see FIG. 11), and the belt-connecting slider 32 is subsequently pulled or pushed in the first direction (X) to a desired position to adjust the seatbelt 5 to a desired length. When the desired length of the shoulder straps 51 is reached, the actuator 33 is released from the pressing action so as to permit restoration of the actuator 33 from the disengaging position to the engaging position by the urging action of the urging member 34.

With the inclusion of the actuator 33 in the seatbelt adjusting device 3 and by providing the first engaging members 317 on the guiding track 31 and the second engaging member(s) 335 on the actuator 33 of the seatbelt adjusting device 3 of this invention, the aforesaid drawbacks associated with the prior art can be eliminated.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A seatbelt adjusting device for a safety seat having a backrest and a seatbelt connected to the backrest, said seatbelt adjusting device comprising:

a guiding track adapted to be secured to the backrest, extending in a first direction, having first and second ends opposite to each other in the first direction, and provided with a plurality of first engaging members that are arranged along the first direction;

a belt-connecting slider mounted on said guiding track, adapted to be connected to the seatbelt, and being slidable on said guiding track in the first direction for adjusting the seatbelt;

an actuator provided with a second engaging member and mounted movably on said belt-connecting slider so as to be co-slidable with said belt-connecting slider on said guiding track to align said second engaging member with one of said first engaging members, said actuator being operable to move relative to said belt-connecting slider between an engaging position, in which said second engaging member engages with one of said first engaging members, thereby preventing sliding movement of said belt-connecting slider on said guiding track, and a disengaging position, in which said second engaging member is disengaged from said first engaging members, thereby permitting sliding movement of said belt-connecting slider on said guiding track;

an urging member biasing said actuator toward said engaging position;

wherein the first engaging members are a plurality of first teeth, and the second engaging member is a second tooth;

wherein said guiding track includes a pair of parallel rails that are opposite to each other in a second direction transverse to the first direction, at least one of said rails being formed with said first teeth projecting therefrom and aligned with each other, said belt-connecting slider being mounted slidably on said rails, when said actuator is disposed at said engaging position, said second tooth is disposed in one of said engaging grooves in said at least one of said rails;

wherein said rails cooperatively define a trough therebetween, said belt-connecting slider includes a central part that is received in said trough, and a pair of wings opposite to each other in the second direction and projecting outwardly from said central part; and wherein each of said wings defines a guiding groove extending in the first direction for respective said rails extending therethrough so as to permit sliding movement of said belt-connecting slider on said rails.

2. The seatbelt adjusting device as claimed in claim 1, further comprising first and second stoppers connected to said first and second ends of said guiding track, respectively, for preventing removal of said belt-connecting slider from said first and second ends of said guiding track.

3. The seatbelt adjusting device as claimed in claim 1, wherein said central part has a top open end and a bottom wall, and defines an accommodating space in spatial communication with said guiding grooves in said wings;

wherein said top open end is formed with at least one limiting brim disposed above said bottom wall and protruding into said accommodating space in the second direction, and at least one guiding protrusion protruding into said accommodating space in the second direction;

wherein said actuator includes a top wall, said top wall is disposed above said limiting brim.

4. The seatbelt adjusting device as claimed in claim 3, wherein said actuator further includes at least one leg extending downwardly from said top wall of said actuator through said top open end of said central part and into said accommodating space, said leg is formed with said second tooth that is disposed below said limiting brim and that protrudes in the second direction into said guiding groove in a respective one of said wings;

wherein said urging member abuts against said bottom wall of said central part and said top wall of said actuator and is compressible so as to permit said actuator to move relative to said belt-connecting slider between said engaging and disengaging positions, said second tooth of said leg abutting against a bottom side of said limiting brim by the urging action of said urging member when said actuator is disposed at said engaging position.

5. The seatbelt adjusting device as claimed in claim 3, wherein said bottom wall of said central part is formed with a first protrusion protruding into said accommodating space, said top wall of said actuator being formed with a second protrusion protruding into said accommodating space and correspondingly aligned with said first protrusion, said urging member being in the form of a compression spring that is sleeved on said first and second protrusions.

* * * * *